US012627474B1

(12) United States Patent
Lopez et al.

(10) Patent No.: US 12,627,474 B1
(45) Date of Patent: May 12, 2026

(54) PERSISTENT IDENTIFICATION OF CLIENT DEVICES

(71) Applicant: Instasize, Inc., Sandy, UT (US)

(72) Inventors: Hector Raul Lopez, South Jordan, UT (US); Luca Meschiari, Miami, FL (US)

(73) Assignee: Instasize, Inc., Sandy, UT (US)

( * ) Notice: Subject to any disclaimer, the term of this patent is extended or adjusted under 35 U.S.C. 154(b) by 42 days.

(21) Appl. No.: 18/582,457

(22) Filed: Feb. 20, 2024

Related U.S. Application Data

(60) Provisional application No. 63/485,707, filed on Feb. 17, 2023.

(51) Int. Cl.
| | |
|---|---|
| *H04L 9/08* | (2006.01) |
| *H04W 4/02* | (2018.01) |
| *H04W 12/06* | (2021.01) |
| *H04W 12/08* | (2021.01) |
| *H04W 12/63* | (2021.01) |

(52) U.S. Cl.
CPC ............. *H04L 9/0825* (2013.01); *H04W 4/02* (2013.01); *H04W 12/06* (2013.01); *H04W 12/08* (2013.01); *H04W 12/63* (2021.01)

(58) Field of Classification Search
CPC .... H04L 9/0825; H04W 12/63; H04W 12/08; H04W 12/06; H04W 4/02
See application file for complete search history.

(56) References Cited

U.S. PATENT DOCUMENTS

| | | | | |
|---|---|---|---|---|
| 6,044,154 A | * | 3/2000 | Kelly .................. | H04L 63/0428 |
| | | | | 380/282 |
| 9,363,249 B2 | * | 6/2016 | Lambert ............. | H04L 63/0442 |
| 9,863,376 B2 | * | 1/2018 | Aso ......................... | F02M 59/44 |
| 2021/0234680 A1 | * | 7/2021 | McCann ............. | H04L 63/0435 |
| 2021/0400474 A1 | * | 12/2021 | Stauffer .............. | H04L 63/0869 |
| 2022/0329598 A1 | * | 10/2022 | Bernsen ................... | H04L 9/32 |

* cited by examiner

*Primary Examiner* — Hadi S Armouche
(74) *Attorney, Agent, or Firm* — VLP Law Group, LLP; Michel Bohn; Lance Topham

(57) ABSTRACT

An example system may persistently identify client devices and/or may recover device identifiers for identifying the client devices. Depending on the implementation, the system may receive, by a client device, a set of candidate data representations from a server. The system may determine, by the client device, a matching data representation from the set of candidate data representations that corresponds to a private key accessible by the client device. The system may determine a device identifier based on the matching data representation and may perform one or more operations respective to a launched application using the device identifier.

20 Claims, 7 Drawing Sheets

100

| Launch application on client device |
| :---: |
| 102 |

| Determine whether client device has unique identifier |
| :---: |
| 104 |

| Responsive to determination that client device lacks unique identifier, transmit device parameters to server |
| :---: |
| 106 |

| Receive list of key derivatives from server based on device parameters of client device |
| :---: |
| 108 |

| Check list of key derivatives for key derivative match and identify device based on detected match if key is associated with client device |
| :---: |
| 110 |

| Responsive to determination that no match is in list, generate private key, key derivatives, and/or device parameters |
| :---: |
| 112 |

| Send key derivative(s) and/or device parameter(s) to server |
| :---: |
| 114 |

| Execute operations based on identity of client device |
| :---: |
| 116 |

100

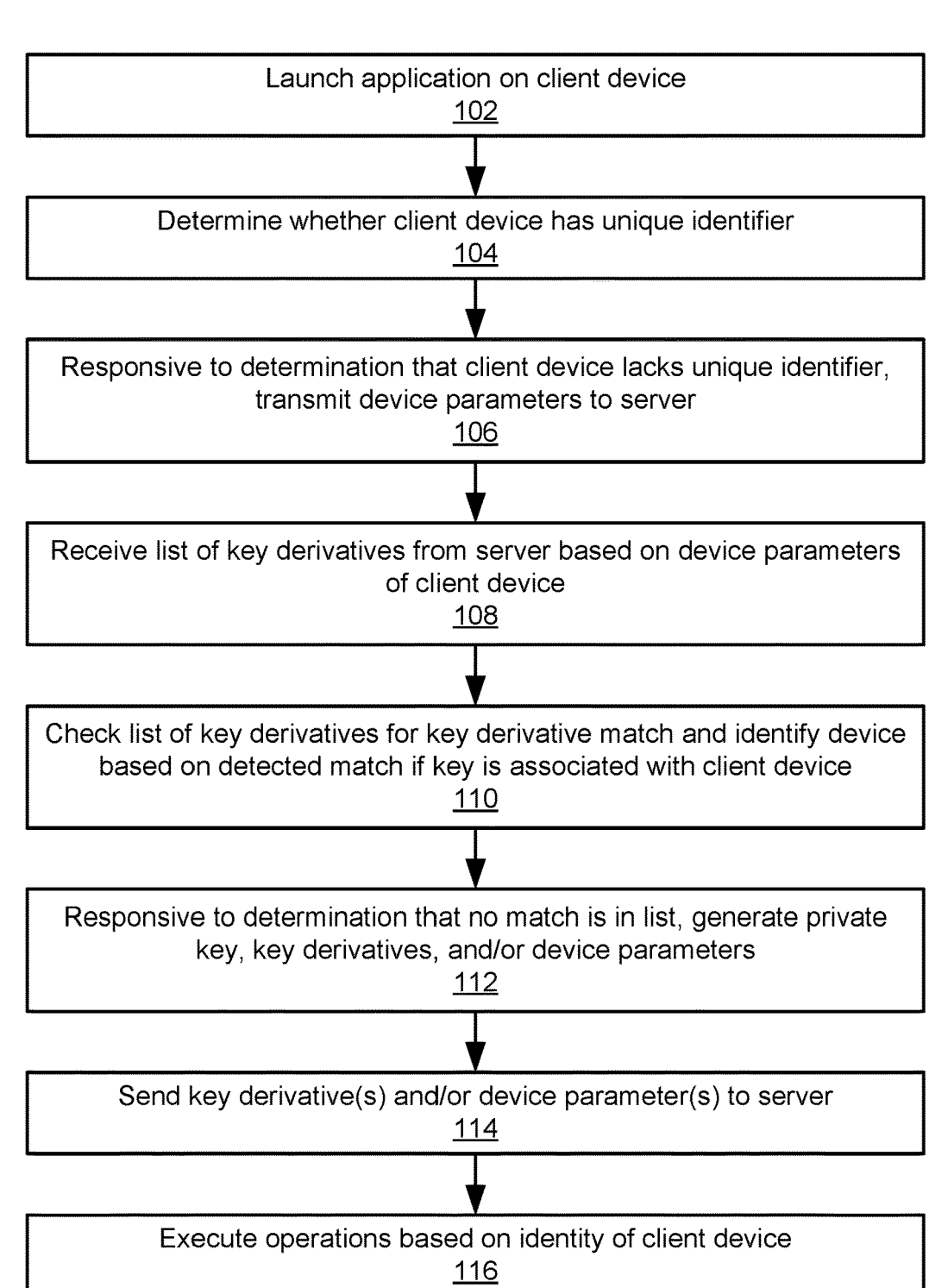

Launch application on client device
102

Determine whether client device has unique identifier
104

Responsive to determination that client device lacks unique identifier, transmit device parameters to server
106

Receive list of key derivatives from server based on device parameters of client device
108

Check list of key derivatives for key derivative match and identify device based on detected match if key is associated with client device
110

Responsive to determination that no match is in list, generate private key, key derivatives, and/or device parameters
112

Send key derivative(s) and/or device parameter(s) to server
114

Execute operations based on identity of client device
116

```
┌─────────────────────────────────────────────────────────────┐
│              Launch application on client device            │
│                            202                              │
└─────────────────────────────────────────────────────────────┘
                              │
                              ▼
┌─────────────────────────────────────────────────────────────┐
│                Send fingerprinting data to server           │
│                            204                              │
└─────────────────────────────────────────────────────────────┘
                              │
                              ▼
┌─────────────────────────────────────────────────────────────┐
│        Receive list of key derivatives with associated device IDs │
│                            206                              │
└─────────────────────────────────────────────────────────────┘
                              │
                              ▼
┌─────────────────────────────────────────────────────────────┐
│              Check list of key derivatives for a match      │
│                            208                              │
└─────────────────────────────────────────────────────────────┘
                              │
                              ▼
┌─────────────────────────────────────────────────────────────┐
│   If match detected, save device ID for future communications, │
│ communicate successful match to server, and/or update fingerprinting │
│                            data                             │
│                            210                              │
└─────────────────────────────────────────────────────────────┘
                              │
                              ▼
┌─────────────────────────────────────────────────────────────┐
│ If no match detected, generate new key pair, extract key derivative, send │
│  key derivative and fingerprinting data to server, receive device ID from │
│         server, store device ID for future communications   │
│                            212                              │
└─────────────────────────────────────────────────────────────┘
                              │
                              ▼
┌─────────────────────────────────────────────────────────────┐
│ Use device ID to update fingerprinting data and send events to server │
│                            214                              │
└─────────────────────────────────────────────────────────────┘
```

Client Device
301

Device has unique
ID? 302 —Yes→ Perform operations
using ID 304

No

Received key
derivatives? 306 —Yes→ B

No

Determine device
parameters 308

Server receives data
303 ←— A

Generate and send
key derivatives
310

C

300b

600

610

Communication Unit
602

Processor
604

Memory
606

Database(s)
608

Input Device
614

Output Device
616

ID Engine
542

Application(s)
544

Identification Service
534

Web Server
536

PERSISTENT IDENTIFICATION OF CLIENT DEVICES

BACKGROUND

The present specification generally relates to a technology for persistently identifying client devices.

Identification of client devices or users can be useful for many different purposes, such as assisting users to consistently log in to the same account, activity tracking, targeted advertising, or otherwise providing consistent user experiences on computing devices. Many beneficial services are facilitated based on user or client identity.

Previously, browser cookies have been used to identify client devices when they interact with servers via browsers. For mobile devices, such as smartphones, other means of identifying the devices have been used. For example, Apple® may use IDFA (ID for advertisers), Android® may use AAID (Android advertising ID), or Google® may use GAID (Google advertising ID) to identify client devices across applications (e.g., mobile apps). Unfortunately, access to these methods of identification may be restricted, controlled by a single entity, or may be reset after certain time periods (e.g., 30 or 60 days), which significantly limits the ability of servers to identify client devices. Accordingly, user experience is impaired, computer functionality is reduced, and computational inefficiencies result. For example, using these previous methods, users may be required to re-enter their login credentials or their graphical user experiences on websites or applications, or they may not be tailored to their preferences or their data.

SUMMARY

An improved system can be configured to perform particular operations or actions by virtue of having software, firmware, hardware, or a combination of them installed on the system that in operation causes or cause the system to perform the actions. In some aspects, the techniques described herein relate to a method including: receiving, by a client device, a set of candidate data representations from a server; determining, by the client device, a matching data representation from the set of candidate data representations that corresponds to a private key accessible by the client device; determining a device identifier based on the matching data representation; and performing, by the client device, one or more operations respective to a launched application using the device identifier.

In some aspects, the techniques described herein relate to a method, further including: launching, by the client device, the application on the client device; and responsive to launching the application on the client device, transmitting, by the client device, a set of device parameters to the server, the set of device parameters indicating one or more of a model, a location, and a cellular carrier of the client device.

In some aspects, the techniques described herein relate to a method, further including: filtering, by the server, a set of data representations to determine the set of candidate data representations using the set of device parameters; determining, by the server, a set of device identifiers corresponding to the set of candidate data representations; and transmitting, by the server, the set of candidate data representations and the set of device identifiers to the client device.

In some aspects, the techniques described herein relate to a method, wherein: determining the matching data representation from the set of candidate data representations includes decrypting the matching data representation using the private key; and determining the device identifier based on the matching data representation includes determining the device identifier from the set of device identifiers received from the server based on an association of the device identifier with the matching data representation.

In some aspects, the techniques described herein relate to a method, further including: determining, by the client device, that a previous set of candidate data representations lacks a match with one or more private keys accessible to the client device; generating, by the client device, the private key and a key derivative matching the private key, the matching data representation including the generated key derivative; and transmitting, by the client device, the key derivative to the server.

In some aspects, the techniques described herein relate to a method, further including: determining, by the server, the device identifier; associating, by the server, the device identifier with the matching data representation in a data table accessible to the server; and transmitting, by the server, the device identifier to the client device, the client device storing the received device identifier locally and using the device identifier for communications with the server.

In some aspects, the techniques described herein relate to a method, further including: transmitting, by the client device, a set of device parameters to the server, the set of device parameters indicating one or more of a model, a location, and a cellular carrier of the client device; and storing, by the server, the set of device parameters in a data table accessible to the server in association with the matching data representation.

In some aspects, the techniques described herein relate to a method, wherein: the matching data representation includes a public key derived from the private key.

In some aspects, the techniques described herein relate to a method, wherein: determining the matching data representation from the set of candidate data representations includes querying, by the client device, a local secure data store on the client device to determine whether one or more of the set of candidate data representations corresponds to the private key stored in the local secure data store.

In some aspects, the techniques described herein relate to a system including: one or more processors; and one or more computer memories storing instructions that, when executed by the one or more processors, cause the system to perform operations including: receiving a set of candidate data representations; determining a matching data representation from the set of candidate data representations that corresponds to a private key; determining a device identifier identifying a client device based on the matching data representation; and performing one or more operations respective to a launched application using the device identifier.

In some aspects, the techniques described herein relate to a system, wherein the operations further include: launching the application on the client device; and responsive to launching the application on the client device, transmitting a set of device parameters to a server, the set of device parameters indicating one or more of a model, a location, and a cellular carrier of the client device.

In some aspects, the techniques described herein relate to a system, wherein the operations further include: filtering a set of data representations to determine the set of candidate data representations using the set of device parameters; determining a set of device identifiers corresponding to the set of candidate data representations; and transmitting the set of candidate data representations and the set of device identifiers to the client device.

In some aspects, the techniques described herein relate to a system, wherein: determining the matching data representation from the set of candidate data representations includes decrypting the matching data representation using the private key; and determining the device identifier based on the matching data representation includes determining the device identifier from the set of device identifiers received from the server based on an association of the device identifier with the matching data representation.

In some aspects, the techniques described herein relate to a system, wherein the operations further include: determining that a previous set of candidate data representations lacks a match with one or more private keys accessible to the client device; generating the private key and a key derivative matching the private key, the matching data representation including the generated key derivative; and transmitting the key derivative to a server.

In some aspects, the techniques described herein relate to a system, wherein the operations further include: determining the device identifier; associating the device identifier with the matching data representation in a data table accessible to the server; and transmitting the device identifier to the client device, the client device storing the received device identifier locally and using the device identifier for communications with the server.

In some aspects, the techniques described herein relate to a system, wherein the operations further include: transmitting a set of device parameters to the server, the set of device parameters indicating one or more of a model, a location, and a cellular carrier of the client device; and storing the set of device parameters in a data table accessible to the server in association with the matching data representation.

In some aspects, the techniques described herein relate to a system, wherein: the matching data representation includes a public key derived from the private key.

In some aspects, the techniques described herein relate to a system, wherein: determining the matching data representation from the set of candidate data representations includes querying a local secure data store on the client device to determine whether one or more of the set of candidate data representations corresponds to the private key stored in the local secure data store.

In some aspects, the techniques described herein relate to a method including: receiving, by a server, a set of device parameters describing a client device; filtering, by the server, a set of key derivatives to determine a set of candidate key derivatives using the set of device parameters; determining, by the server, a set of device identifiers corresponding to the set of candidate key derivatives; and transmitting, by the server, the set of candidate key derivatives and the set of device identifiers to the client device.

In some aspects, the techniques described herein relate to a method, further including: receiving, by the server, a key derivative from the client device; determining, by the server, a device identifier; associating, by the server, the device identifier with the key derivative and the set of device parameters in a data table accessible to the server; and transmitting, by the server, the device identifier to the client device, the client device storing the received device identifier locally and using the device identifier for communications with the server.

Other embodiments of one or more of these aspects include corresponding systems, apparatus, and computer programs, configured to perform the actions of the methods, encoded on computer storage devices.

It should be understood that the language used in the present disclosure has been principally selected for readability and instructional purposes, and not to limit the scope of the subject matter disclosed herein.

BRIEF DESCRIPTION OF THE DRAWINGS

The disclosure is illustrated by way of example, and not by way of limitation in the figures of the accompanying drawings in which like reference numerals are used to refer to similar elements.

FIG. 1 illustrates an example method for identifying a client device and using the device identifier to perform operations.

FIG. 2 is a flowchart depicting an example method for determining and tracking a device identity over time.

DESCRIPTION

Figure 3A:
FIGS. 3A and 3B illustrate a flowchart of an example method for determining, tracking, and using device identities.

The present specification generally relates to technology for persistently identifying client devices. The technologies may improve over the previous solutions presented in the Background and provide numerous technical solutions to these problems along with other benefits. For example, the technology identifies client devices and provides continuity in identifying the client devices over longer time periods. The technology provides these features in robust and persistent ways, which may also provide faster processing than previous solutions. Accordingly, the technology may provide continuity to user data, preferences, and events thereby improving user experience, among other benefits, such as advertising conversion tracking, linking events between separate applications, autosuggesting login between applications from the same company, maintaining continuity of events, preserving subscription information, purchase tracking, purchase and LTV (lifetime value) tracking between applications, etc.

Accordingly, implementations of the technologies described herein may allow a client device to identify itself to an external server using a private key stored on the client device. The client device may locally check its private key against a set of key derivatives provided to the client device by a remote server. For example, a server may narrow possible key derivatives to a set based on one or more device parameters, send the set of key derivatives to the client device, and the client device may then locally determine whether its identity correspond to one or more of the received key derivatives. Based on its determination, the client device may confirm its identity to the server, for example, by noting the matched key derivative(s). Accordingly, a device effectively owns its own identity by keeping a private key and using it to allow external servers to identify the device under certain circumstances.

As described in further detail throughout this disclosure, the technology may use client IDs, private keys, key derivatives, fingerprinting, and/or various device parameters to persistently identify client devices. Some or all of these fields may be stored locally on a client device, such as in a local storage or other device storage (e.g., a mutually accessible storage outside of an application's individual data or sandbox), which may be in specialized (e.g., for private keys) or generalized storage (e.g., for other device data). For instance, local storage may include a local storage on a smartphone that may allow a private and/or public key to be stored, which may be associated with a specific individual or device. A server may store a database of associated values and perform a smart analysis to determine and provide a subset of keys or key derivatives that the client device may use to identify itself, for example, by determining or updating a client ID.

A key derivative may be data that may be associated with or otherwise that a private key may be used to identify. For instance, a key derivative may be any representation or value associated with a key or key value pair that is capable of identifying the key or key pair or other unique code stored on the client device. In some implementations, the key derivative may be a public key of the private key or a representation of the public key, such as another data representation associated with the private and/or public key value.

In some instances, the technology may generate a private key (e.g., stored in a local storage or folder on a mobile client device), take a public representation of the private key, and use it with a table of keys to determine a subset of keys or key derivatives, which may be tested (e.g., locally on a client device) to identify the client device. When installing or launching an application, the technology may ping the private storage, and provide a data representation of the private key, which may be matched against a list of key or key derivatives to attempt to identify the user/client device. Accordingly, client IDs may be assigned based on locally stored private keys, among other improvements, which client IDs may be associated with a client device rather than being tied to a particular application or browser, thereby allowing data to be shared between multiple applications without the user having to login or, potentially, be prompted to log in with the same credentials to identify themselves/the client device.

These technologies, operations, features, and benefits are described in further detail throughout this disclosure. The features and advantages described herein are not all-inclusive and many additional features and advantages will be apparent to a person of ordinary skill in the art in view of the figures and description. Also, it should be noted that the language used in the specification has been selected for readability and instructional purposes and not to limit the scope of the inventive subject matter.

With reference to the figures, reference numbers may be used to refer to components found in any of the figures, regardless of whether those reference numbers are shown in the figures being described. Further, where a reference number includes a letter referring to one of multiple similar components (e.g., component 000a, 000b, and 000n), the reference number may be used without the letter to refer to one or all of the similar components.

FIG. 1 illustrates an example method 100 for identifying a client device 301 and using the device identifier to perform operations. Although described in reference to an ID engine 542 and a server (e.g., an identification service 534 operating on a server 303), the operations may be performed by different devices, further delineated or divided, or otherwise modified. It should be understood that each of these applications may fully or partially perform the functionalities described herein and that their functionalities may be condensed to fewer devices or distributed differently. Operations of the method 100 are described in further detail in reference to other figures herein, which provide alternative or additional details.

In some implementations, at 102, an application may be launched on a device 301. For instance, the application may be a mobile application launched on a smartphone or other device 301. The application may communicate with a server (whether an identification server 303 or a third-party 522 or application server 524) to identify the client device 301 and/or provide cloud services to the client devices 301, etc., as noted above. The server 303 may communicate with the application and/or an SDK, etc., to identify the client device 301, as described in further detail below. Various applications, which may communicate with various servers, may communicate with an identification server 303 and/or may include instances of the identification service 534 to identify the device 301, so that a plurality of, potentially unrelated, applications may use the same operations, private key(s), or other technologies described herein to identify the device 301 for their operations.

For example, at 104, an ID engine 542, which may be an engine in the application or accessible to the launched application, part of an SDK, etc. (e.g., as described below), may determine whether the client device 301 has a unique identifier for identifying the client device 301. For instance, the client device 301 may check if a unique ID is stored for the application or device 301 in local storage (e.g., on a data storage device 546).

At 106, the ID engine 542 may, responsive to a determination that the client device 301 lacks a unique identifier associated therewith, transmit one or more device parameters to a server (e.g., an identification service 534 executed on a server 303). The device parameters may include a public representation of a private key, various fingerprinting data, or other parameters. For instance, the device parameters are described in further detail below, but may include device model, device sub-model, device total memory, cellular carrier, applications installed, etc. In some implementations, a private key may be generated if not previously generated, as described in reference to FIGS. 3A and 3B.

At 108, the ID engine 542 may determine or receive a list or set of candidate key derivatives from a server 303, for example, based on device parameters of the client device 301. For instance, the server 303 may determine and return a list of key derivatives based on the device parameters sent by the client device 301 or determined about the client device 301.

The key derivatives may include values associated with a private key. For instance, a private key may be generated on the client device 301 when the application is launched or installed or when it is otherwise identified (e.g., based on a user login, an identification based on device parameters, etc.). The private key may remain secret and stored locally on the client device 301, such as on a shared storage or private enclave in a data storage device 546. A public representation of the private key may be sent to a server 303, associated with the particular user or client device 301 (e.g., based on a login, a device ID, etc.), and stored in a list of public keys, public representations, or associated derivatives or values, which may, for instance, be identified using a private key. In some implementations, key derivatives and/or a private key may be generated on a server 303 and transmitted to the client device 301. Each time the user launches the application, the ID engine 542 and/or server 303 may perform an analysis to determine a subset of keys, public keys, or other key derivatives, which an ID engine 542 on the client device 301 may try against the private key to identify the user/client device 301. For instance, a set of possible (e.g., narrowed by context, device type, location, or other parameters) public keys (associated with users or devices 301 in a data table on the server 303) may be sent to an ID engine 542 operable on the client device 301, which identifies which of the public keys or key derivatives is the correct key/key derivative matching a locally stored private key.

For example, if a user is using a social media or other application, device parameters or other smart fingerprinting data (e.g., identifying device type, applications on the device 301, screen resolution, OS version, location, IP address, and/or other parameters) may be sent to the server 303 by the client device 301 (e.g., based on a data request for a webpage, application data, or by an ID engine 542). The server 303 (e.g., the identification service 534) may have access to a large set of key derivatives and may narrow the set of potential key derivatives to, for example, 2,000, 10,000, or 100,000 values using the received data. Some or all of these values may be sent to the client device 301 (e.g., all at once or in a series of attempts), which may check the values (e.g., a set of 2000 values may be checked in a fraction of a second) against a locally stored code, such as a private key. As described in further detail below, the client device 301 may send the identified public key or key derivative to the server 303, which may match it against a table associating key derivatives to users and/or client devices 301, etc., and/or the client device 301 may locally match the determined key derivative with a client ID associated with the key derivative and received with the set of 2000, 10,000, or 100,000 received values/derivatives. Accordingly, the server 303 may identify the user, track events, etc. Although this simplified example is provided as context here, other details are described in further detail below.

At 110, the ID engine 542 may check the list of key derivatives for a key derivative match, for example by performing a defined hash operation using the private key. If a match is detected, the client device 301 may identify the detected match to an application running locally, which may send the information to a server 303, or the ID engine 542 may identify the match directly to an identification engine on a remote server 303. For instance, using the list of key derivatives received from a server 303, the client device 301 may loop over the list of derivatives or representations until a match is detected (e.g., against a private key in the enclave or other data storage), whether where the key derivatives are received together in a large batch or in a series of batches. The derivative may be associated with an identifier, which may be used to identify the client device 301, as described in further detail below.

At 112, the ID engine 542 may, responsive to a determination that no match is the list, generate a private key, generate private key derivatives, and/or one or more device parameters. For instance, if no match is detected in the list of key derivatives, the ID engine 542 or client device 301 may generate and store a private key (e.g., in a secure enclave or storage accessible to the ID engine 542 one or more applications/programs). In some instances, the client device 301 may also generate one or more private key derivatives or representations (e.g., public keys, etc.) and identify device parameters of the device 301.

At 114, the ID engine 542 may send the key derivative(s) and/or device parameter(s) to the server 303. For instance, the client device 301 may transmit the generated derivative and/or determined device parameters to a server 303, which associates the derivative and/or parameter(s) with other information, such as user login information, and other information. In some instances, the server 303 may generate a client identifier or unique ID and associate it in the data table with the derivatives, parameters, and other data, such as event data, log information, and other data. In some instances, the client ID may be sent to the application to use in future communications, as described in further detail below.

In some implementations, at 116, the application, client device 301, and/or server 303 may execute operations based on the identity of the client device/client identifier. For example, the user experience and graphical user interfaces may be adapted to the user based on their identity, preferences, or data and/or additional operations may be performed (e.g., tracking click streams or events).

FIG. 2 is a flowchart depicting an example method 200 for determining and tracking a device identity over time. The operations of the method 200 may be used alternative to or in addition to those described elsewhere herein, such as in reference to the other figures. For example, the operations of the method 200 may provide additional detail for other operations described herein. Although the operations of the method 200 are described in reference to the ID engine 542, some or all of them may be executed on the server 303 and/or another computer. For example, while certain operations are described as being performed by the ID engine 542, they may be performed by various devices or modified.

In some implementations, at 202, an application may be launched on a client device 301, which may attempt to identify the client device 301, as described above.

At 204, the ID engine 542 may send fingerprinting data to a server 303. The fingerprinting may include device parameters, such as are described above. Examples of fingerprinting data include, but are not limited to, device model, device sub-model, device memory, country, language, cellular carrier, Wi-Fi network, location, currency, measurement units (e.g., metric or imperial set on a device 301), vender identifier, applications installed on client device 301, dark mode or light mode status, etc. These or other "fingerprints" or parameters may be sent to the server 303, which may use the parameters to identify the client device 301 and/or determine/filter a list/set of key derivatives.

As described above, the server 303 may match the fingerprinting data or parameters against a database or table of parameters to reduce a list of possible derivatives or values. For example, the server 303 may determine a list of 10,000 to 100,000 (or other quantity) values that may be returned quickly.

At 206, the ID engine 542 may receive a list of key derivatives with an associated device ID, for example, from the server 303. As noted above, the list or set of key derivatives may be public keys, although other implementations are possible, such as any association or derivative of the private key or data representation.

At 208, the ID engine 542 may check the list of key derivatives for a match. For example, the ID engine 542 may recursively check the list until one is found that matches the private key. For instance, where the private key is stored in a local storage, the ID engine 542 may ping the local storage until a successful result from among the received set of key derivatives is determined.

In some implementations, the application or ID engine 542 on the client device 301 may use brute force to process the list of derivatives; however, processing a list of 10,000 to 100,000 values may be performed in a fraction of a second, which may be faster than previous methods.

At 210, the ID engine 542 may, if a match is detected at 208, save the device ID for future communications. The ID engine 542 may also communicate the successful match to the server 303 and/or update fingerprinting data. For instance, the ID engine 542 may communicate the detected match to the server 303, which checks it against the database/table and determines a device ID. For example, if a match is found, the SDK may save the device ID locally to be used for future server communications. The SDK may also send fingerprinting data to the server 303, so it can be updated if necessary (e.g., for future identification or filtering, as described). The server 303 may communicate the device ID to the client device 301, which may store the device ID, for instance, in application data of the application, for use in future identification. So long as the device ID is stored, the ID engine 542 may bypass checking key derivatives, etc., as described herein, instead opting to use the device ID. If the device ID is erased or lost, the operations of the methods 100 or 200 may be performed to generate or refresh the device ID.

At 212, the ID engine 542 and/or the server 303 may, if no match is detected at 208, generate a new key pair, extract one or more key derivatives, and send the key derivative(s) and/or fingerprinting data to the server 303. In some implementations, the server 303 may determine and associate a device ID, and the ID engine 542 may receive the device ID from the server 303 and store the device ID for future communications. If the device ID becomes outdated or deleted, the ID engine 542 may, later, use the locally stored private key to identify itself to external sources.

For instance, if no match is found, the ID engine 542 or server 303 may assume a new user or client device 301. A new key pair may be generated by the ID engine 542 or client device 301. A key derivative may be extracted by the ID engine 542 or the server 303. For instance, a key derivative may be any representation associated with a key/keypair that is capable of being identified by, or identifying, the key/key pair or other unique code stored on the client device 301. For example, an SDK on the client device 301 may send the key derivative and fingerprinting data to the server 303, which may store the received data in a structured database. The server 303 may then assign and send back a new device ID, which may be stored by the SDK locally on the client device 301 for future communications with one or more servers (e.g., the assigning or another server). Accordingly, the client device 301 may communicate with the server 303 to establish its device ID, which may be more quickly or easily used in future communications with the same or different server(s) to identify the client device 301. The server 303 may also store the device ID, key derivative, and fingerprinting data in association with one another in a data table for future reference in identifying the user or device 301, recovering the device ID, or tracking events, etc.

In some implementations, the key derivative may be a public key of a private key stored on the device 301. In other implementations, the key derivative may be another data representation associated with the private and/or public key. Accordingly, a code, secure identifier, or private key may be stored and persist on the client device 301 and used to identify (e.g., in conjunction with operations executed on the client device 301) the client device 301 without the server 303 having access directly to the code, secure identifier, or private key. For instance, by the client device 301 and server 303 cooperating, the client device 301 may be identified. The private key may also be used for other purposes, such as signing transmissions, etc.

Additionally, because the private key (or other private code) may be stored in a secure storage location or enclave accessible to multiple applications, multiple separate applications may use it to identify the user/client device 301, thereby providing continuity, increasing efficiency, and improving user experience across applications. Accordingly, it may be used to prove to one or more external servers that the multiple applications are on the same device 301 or associated with the same user.

Accordingly, a single private key on a client device 301 may be used for various purposes, such as where separate instances of an ID engine 542 use the private key, potentially using different cryptographic algorithms or protocols, to identify themselves to external servers using the operations described herein.

In some implementations, at subsequent launches of the application and/or communications with the server(s) 303, 522, or 524 (e.g., when requesting services, etc.), at 214, the ID engine 542 may use the device ID to update (e.g., transmit to the identification service 534 on the identification server 303) the fingerprinting data and/or send events or requests to one or more servers 303, 522, or 524 that use the device ID (whether the identification server 303, an application server 524, or a third-party server 522. For instance, once a device ID is established for an application, it may be stored and used in future communications or event recording (e.g., instead of the key representation identification process described elsewhere herein). The client device 301 may also update fingerprinting data or device parameters on the server 303 periodically using the device ID.

Accordingly, in instances where IDFA, web cookies, or other traditional device identification methods are not available, the technology may determine a device ID and, if lost or non-existent, establish/reestablish it. Similarly, the device ID may be automatically determined and associated across multiple applications (e.g., on a mobile computing device, such as an iPhone® or Android®-based client device 301).

Figure 3B:
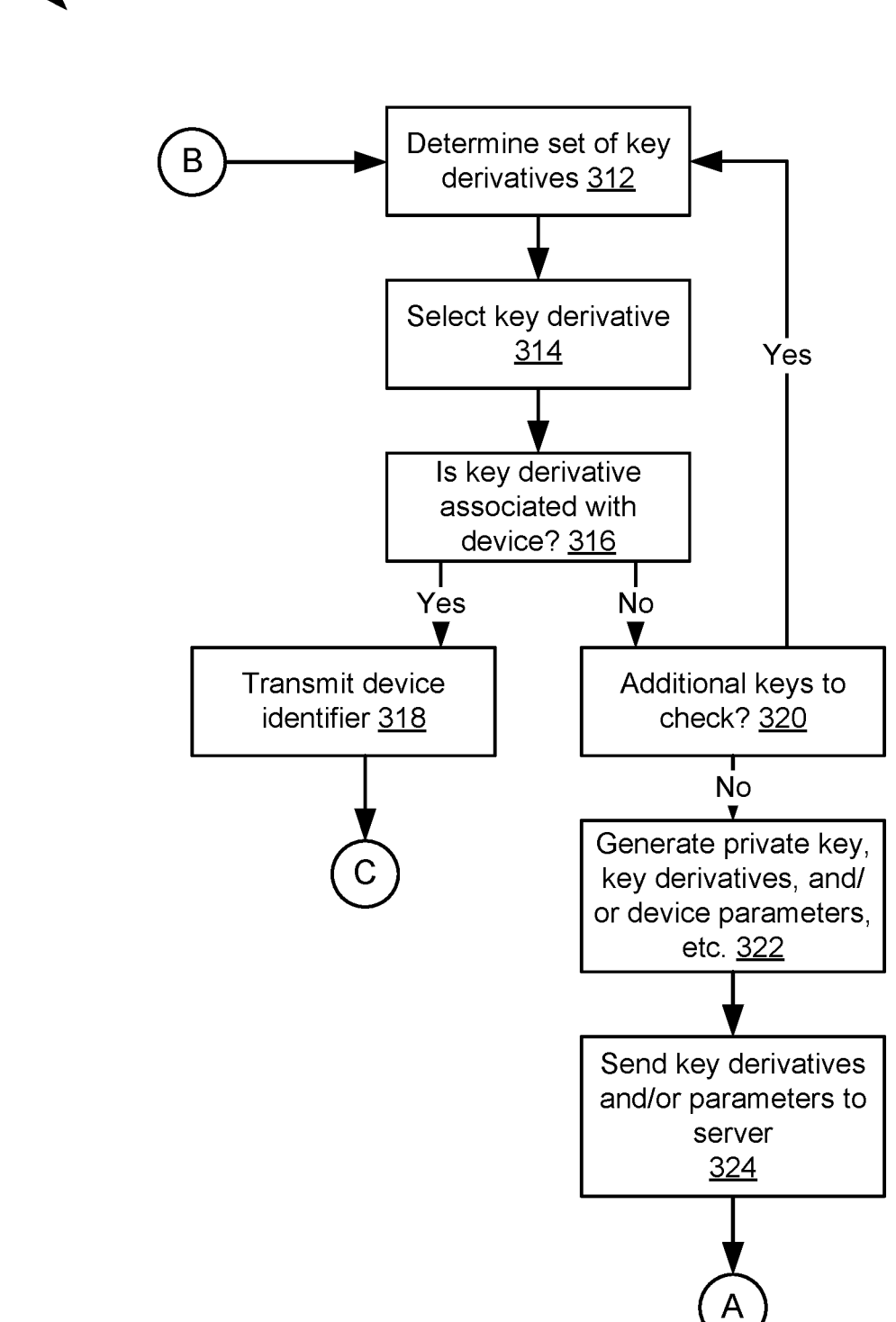

FIGS. 3A and 3B illustrate a flowchart of an example method 300a and 300b for determining, tracking, and using device identities. As noted elsewhere herein, the operations of the method 300a and 300b may be used in addition to or alternative to the other operations described herein (e.g., in reference to FIGS. 1 and 2). Similarly, although specified operations are described as being performed on the client device 301 and on the server 303, other implementations are possible and contemplated herein. As illustrated in FIGS. 3A and 3B, a client device 301 is illustrated along with a server 303. The other lines and blocks represent operations, decisions, and data transmissions, etc.

Although other implementations are possible, a client device 301 may represent a client device 301 described elsewhere herein. Similarly, a server 303 may represent an identification server 303, application server 524, or third-party server 522.

The server 303 may keep track of the devices 301 using a table that contains a device ID(s) (e.g., generated by the server 303), key derivative(s), device data for fingerprinting, for example, where each device 301 has data stored as a row or column in the table accessible to the server 303. The database may also have other tables used to represent the events performed on each individual app. These other tables may be linked to the main device table to associate rows or cells of data, for example, thereby creating a three or more-dimensional data representation of the data via which data is associated for the client ID or other device data.

The server 303 may also be in charge of the fingerprinting process, so that once it gets a list of device data points from the SDK, it matches them to the fingerprinting data on the device table and may generate a list of key derivatives candidates to be sent to the device 301. The key derivative(s) may be sent to the SDK alongside their respective device ID(s).

In some implementations, when a server 303 receives a key derivative from the SDK it creates a new row on the device database and assigns a unique device identifier to the data representation. The server 303 may also be in charge of keeping the device fingerprinting data up to date based on data received by the SDK. The data representations may be sent to the SDK, potentially alongside their respective client IDs, so that the client device 301 may determine its own client ID against the private key using the data representations.

The client device 301 may execute an ID engine 542, which may communicate with, be, include, or be executed in a mobile software development kit (SDK). The mobile SDK communicates with the server 303 to recognize the user or device 301 using the list of key derivatives. When it finds a match, it saves a server-generated device ID attached to the key derivatives (to be used for future server communications) and communicates the match to the server 303.

If a match is not found then the device 301 is considered new. A key pair may be generated on the secure storage (e.g., on a client device 301, local storage, secure folder, or other local storage), the key derivative may be extracted, and the key derivative may be sent to the server 303 in order to receive the new device ID, as describe herein. The SDK may also send the fingerprinting data or other data to the server 303. After a match is achieved (or a new key has been created) the SDK may use the device ID to update fingerprinting data and send events to the server 303.

At 302, the client device 301, for example, based on searching a local file or communicating with the server 303, may determine whether the device 301 has a unique ID assigned thereto or stored thereon. At 304, if the device 301 has a device or unique ID, then it may proceed to use the ID to perform operations, report events, retrieve data, or perform the other use-cases described above, for example.

At 306, if it is determined that the device 301 does not currently have or have access to a unique ID, the client device 301 may determine whether a list or set of key derivatives are stored or accessible on or to the unique ID. For instance, the ID engine 542 may determine whether a set of key derivatives has been received from the server 303. If the determination is positive (e.g., that the client device 301 has received a set of key derivatives), the process may proceed to 312.

At 308, if the determination at 306 is negative (e.g., that the ID engine 542 does not have access to or has not received a set of key derivatives from the server 303, for example, within a determined time period), the client device 301 and/or server 303 may determine device parameters. For instance, device parameters or fingerprinting data may be sent by the client device 301 to the server 303 directly as part of the identification process or in other data requests, such as requests for services provided by one or more servers (whether the identification server 303 or a different server). For example, the client device 301 may include data with a communication to the server(s) 303 indicating its operating system, location, applications installed, or other parameters.

At 310, the server 303 and/or the client device 301 may generate and send key derivatives. For instance, the server 303 may generate a list of key derivatives and transmit them to the client device 301, as described above. In some implementations, the server 303 may also send a private key to be stored on the client device 301. In some implementations, a client device 301 may have or generate a private key and, using a defined algorithm, may generate a key derivative and send it to the server 303. As noted above, the derivatives may be private key representations values that are stored by the server 303 in association with client IDs or other identifying information, fingerprinting, etc.

At 312, the method may determine a set of key derivatives, which may use or be associated with device parameters or fingerprinting data. For instance, the server 303 may match fingerprinting data or device parameters against a set of derivatives or data representations to determine which key derivatives to send to the client device 301. The server 303 may transmit the determined (e.g., filtered) set of key derivatives to a client device 301, which may process them to check for matches a locally stored private key. The private key representation values sent may be a subset of the total possibilities. For instance, many more key derivatives or representations may be sent to the device 301 than would match a local private key. In some implementations, key derivatives may be stored on a client device 301 for a defined time period and then refreshed the ID engine 542 or identification service 534.

At 314, the method may include selecting a key derivative (e.g., where key derivatives are iteratively selected and checked from a received set of key derivatives) by the client device 301, which may, at 316, check the key derivative against the private key or other data stored locally on the device 301 to test for a match (e.g., by pinging a private key in local storage and cryptographically checking the key derivative against the private key).

At 320, if the selected key derivative is not a match, the process may iterate back to 312 or 314 to select a next key derivative and check it for a match.

At 318, if a match is determined, the client device 301 may use the match to determine a device identifier. If the device identifier was received with the key representation, the client device 301 may store it and send it to the server 303 to identify the client device 301. If the device identifier was not received with the key representation, the client device 301 may send the key representation to the server 303, which may match it against or assign a unique client ID and send the client ID back to the client device 301. Accordingly, because direct use of the device ID requires less processing and/or communication resources, it may be more efficient to use it in place of a public key or key derivative directly; however, because the client ID may not be known, the key derivative may be used to determine the client ID, as described herein.

If no key derivative match was found by the ID engine 542, at 322, the method may include generating a private key, key derivatives, and/or device parameters. For instance, as noted above, the client device 301 may locally generate and store a private key and generate a key derivative based on the private key. The key derivative may be a public key or another data representation or value that may be used to check against the private key (e.g., cryptographically) and identify it from a group. Depending on the implementation, the key derivative may be uniquely associated with the private key or may be more generally defined to be able to identify the private key against a subset of possible values (e.g., within a defined percentage of cases, such as where 100,000 values are checked). At 324, the client device 301 may send the key derivative or data representation value to the server 303, which may store it, generate a client ID, associate the client ID with the received data, and transmit the client ID to the client device 301.

Figure 4:
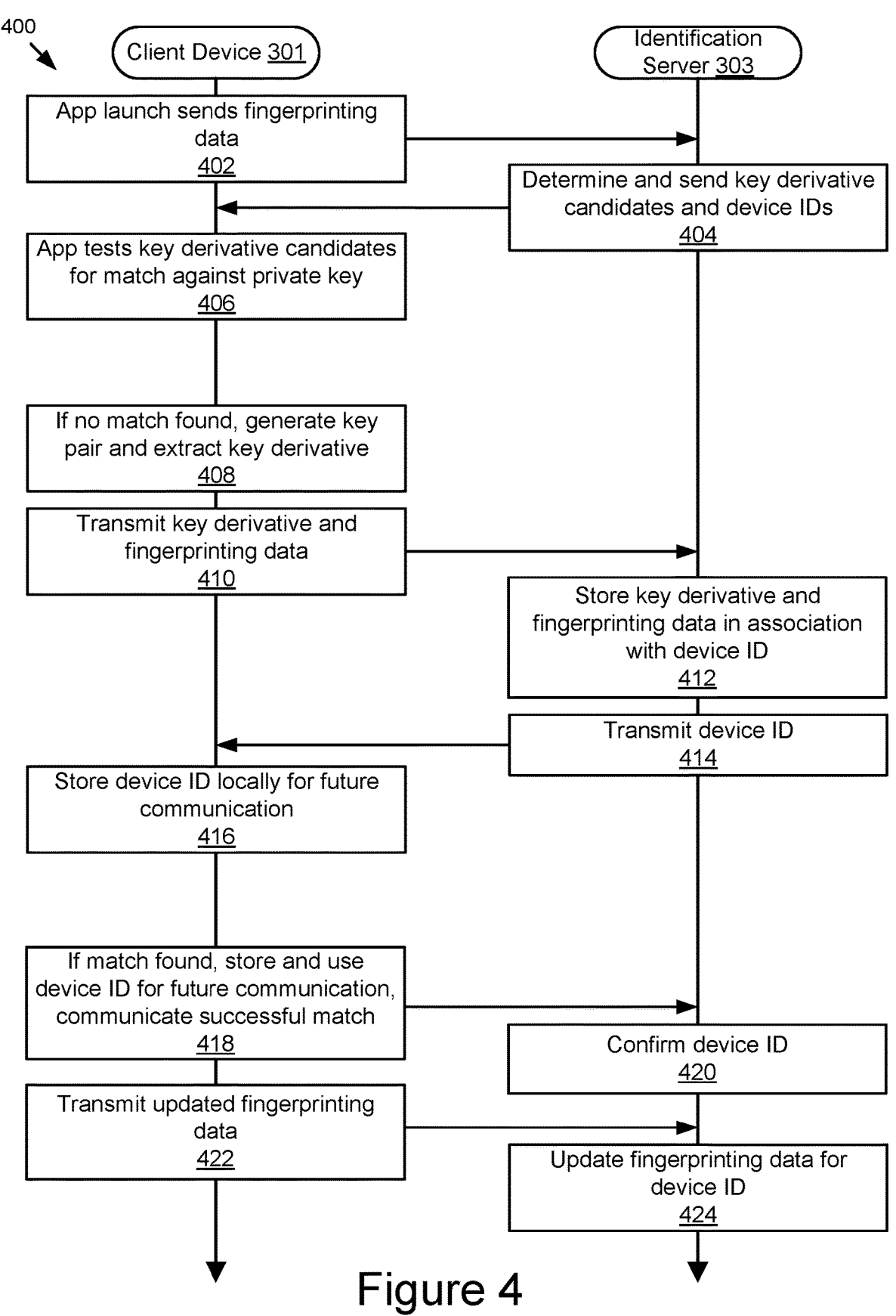
FIG. 4 illustrates an example data-communication diagram for an example method for determining, tracking, and using device identities.

FIG. 4 illustrates an example data-communication diagram for an example method 400 for determining, tracking, and using device identities. The example method 400 may illustrate example operations of other operations and features described herein, such as in reference to FIG. 1-3B, for example, the operations and features may be described throughout this description may be used together, separately, in different orders, or otherwise modified.

It should be noted that, although certain operations are described in reference to certain systems (e.g., a client device 301 and an identification server 303), some operations may be performed on other devices or multiple devices together.

At 402, the client device 301 may launch an application, such as a mobile application 544 including an ID engine 542, which may communicate with an identification server 303. An SDK of the client device 301 may, as part of the communication, send certain data including fingerprinting data to the identification server 303.

At 404, the identification server 303 may determine and send key derivative candidates and device IDs to the client device 301. For instance, the server 303 may keep track of fingerprinting data, along with other data, such as key derivatives and device IDs in a data table. Based on the received fingerprinting data, the server 303 may narrow the set of all possible key derivatives into a candidate list or set based on matching the fingerprinting data in the data table. The server 303 may send the candidate list of key derivatives, and, in some instances, associated device IDs.

At 406, the client device 301, such as the application 544, ID engine 542, or SDK, may test the received key derivative candidates for a match against a locally stored private key.

At 408, if no match was found or no private key is present, the client device 301 may generate a key pair and extract a key derivative. The key pair may be generated and/or stored on a secure local storage of the device 301, such as the Secure Enclave™ of an Apple™ device or the Samsung Blockchain Keystore™ or Knox™.

At 410, the client device 301 (e.g., an ID engine 542 or SDK) may transmit the key derivative and, potentially, fingerprinting data to the identification server 303.

At 412, the identification server 303 may store the key derivative in its data table(s). For instance, the identification server 303 may store the key derivative in association with a received, generated, or previously stored device ID. The identification server 303 may also store or update the fingerprinting data in association with these values. For example, a new row may be created on a device database describing data associated with the device 301, including an assigned unique device ID.

At 414, the identification server 303 may transmit the device ID to the client device 301, which, at 416, may store the device ID locally for future communication. For instance, in future communications, the client device 301 may identify itself using the device ID. In instances where the client device 301 deletes or refreshes the client ID, it may be recovered or reassigned using the fingerprinting and key derivative candidate matching process described above.

If a match was found at 406 or at a subsequent communication or launch of the application, at 418, the client device 301 may store and use the device ID for further communication. The client device 301 may also communicate a successful match to the identification server 303. For instance, the client device 301 may send the matched key derivative, associated client ID, or another notification to the identification server 303.

In some implementations, at 420, the identification server 303 may confirm the device ID, for instance, it may confirm that it is communicating with a known device 301. The identification server 303 (or another server or service) may use the device ID to store data to or retrieve data from an event table associated with the device ID in order to provide a personalized or logged-in experience to the user, such as via one or more mobile applications 544 operating on the client device 301.

At 422, the transmit updated fingerprinting data to the identification server 303, for example, in association with the device ID. This operation may occur after identifying the successful match, periodically, or with other communications. At 424, the identification server 303 may update the fingerprinting data for the determined device ID.

Accordingly, even in instances where a client device 301 does not allow access to an advertising or other ID, the technology allows the client device 301 to identify itself and provide consistent user experiences. When the client device 301 does not currently have an assigned client ID (as described herein) or has deleted it, such as where some client devices 301 periodically delete client IDs and other identifying information, the technologies described herein provide efficient means for recovering, assigning, or re-assigning device IDs. The persistent identification may also allow advertising conversion tracking, linking events between multiple applications (e.g., 544), automatically suggesting login information between applications (e.g., 544) from the same company or released under different user accounts, or otherwise; purchase tracking; lifetime value tracking, preference determination, or other persistent user experiences.

Figure 5:
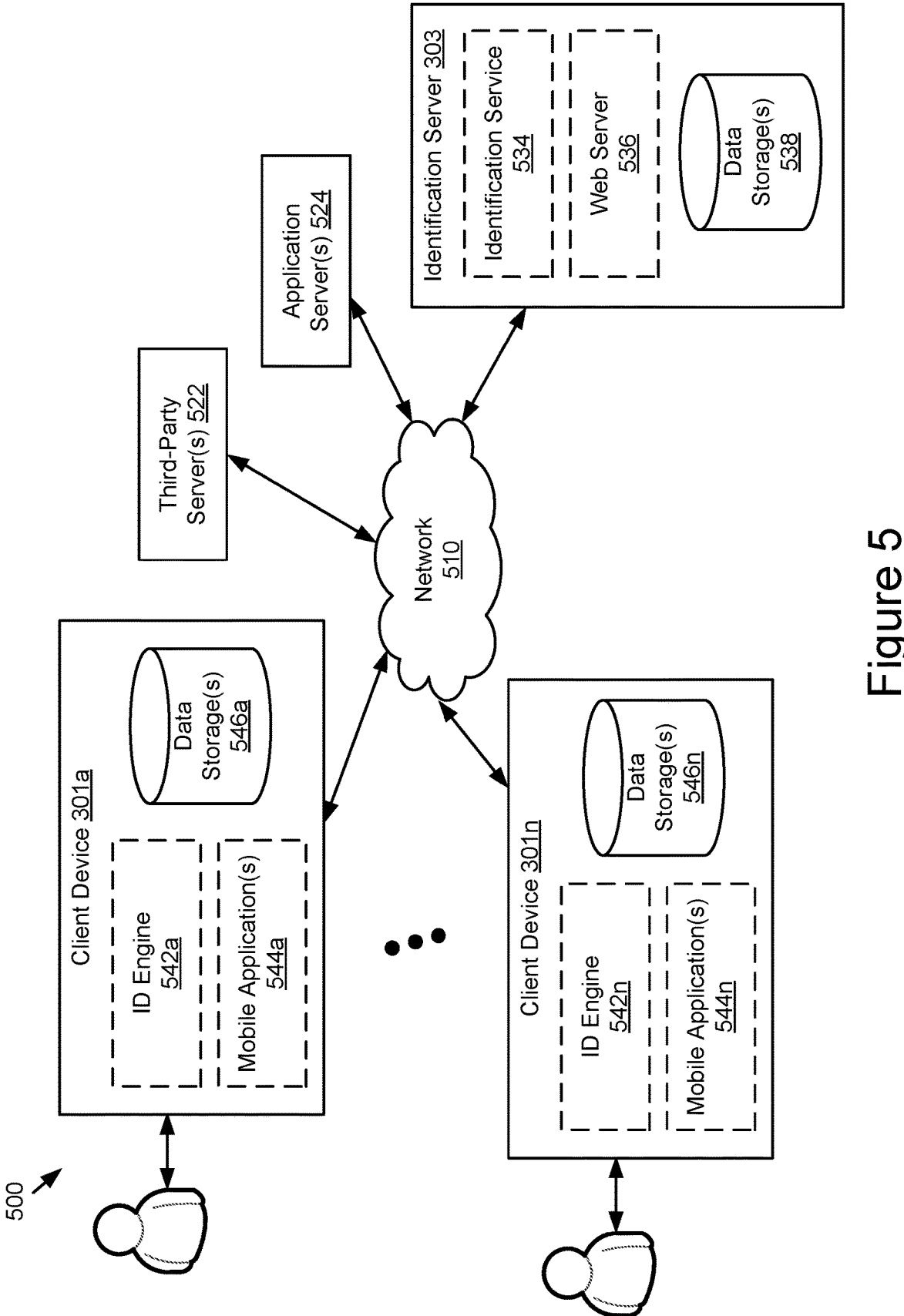
FIG. 5 illustrates a block diagram of an example computing system that may persistently determine user or client device identities.

FIG. 5 illustrates a block diagram of an example computing system 500 that may persistently determine user or client device 301 identities. As illustrated in the example, the computing system may include client device(s) 301$a$ . . . 0.301$n$ (also referred to herein individually and/or collectively as 301), third-party server(s) 522, application server(s) 524, and identification server(s) 303, which are electronically and communicatively coupled via the network 510 for interaction with one another, although other system configurations are possible including other devices, systems, and networks. For example, the computing system 500 may include any number of client devices 301, identification servers 303, third-party servers 522, application servers 524, and other systems and devices. The client devices 301$a$ . . . 301$n$ and/or their components may be coupled to the network 510. The identification server 303 and its components may also be coupled to the network 510. The client devices 301 and the identification server 303 depicted in FIG. 5 only include one or more of the ID engine 542$a$ . . . 542$n$, mobile applications 544$a$ . . . 544$n$, identification service 534, or web server 536, etc. In some instances, these applications implemented on these computing entities may interact with one another to collaboratively perform the functionalities described herein. In some implementations, the client devices 301 may include a smartphone, laptop, desktop computer, or other computing device.

For example, a client device 301 may run an ID engine 542, which may be integrated or may communicate with one or more mobile applications 544. The ID engine 542 may access or communicate with a secure storage area on the client device 301, for instance, where a private key may be stored. The ID engine 542 or another secure service running on the client device 301 may determine whether one of a set of key derivatives matches the private key. The ID engine 542 may communicate with an identification service 534 on an identification server 303 or application server 524, for example, to receive key derivatives, confirm a key derivative, confirm that a match was found among a set of key derivatives, confirm which key derivative includes a match, or perform other operations described herein.

The network 510 may include any number of networks and/or network types. For example, the network 510 may include one or more local area networks (LANs), wide area networks (WANs) (e.g., the Internet), virtual private networks (VPNs), wireless wide area network (WWANs), WiMAX® networks, personal area networks (PANs) (e.g., Bluetooth® communication networks), various combinations thereof, etc. These private and/or public networks may have any number of configurations and/or topologies, and data may be transmitted via the networks using a variety of different communication protocols including, for example, various Internet layer, transport layer, or application layer protocols. For example, data may be transmitted via the networks using TCP/IP, UDP, TCP, HTTP, HTTPS, DASH, RTSP, RTP, RTCP, VOIP, FTP, WS, WAP, SMS, MMS, XMS, IMAP, SMTP, POP, WebDAV, or other known protocols.

The identification server 303 may have data processing, storing, and communication capabilities, as discussed elsewhere herein. For example, the identification server 303 may include one or more hardware servers, server arrays, storage devices and/or systems, etc. In some implementations, the identification server 303 may include one or more virtual servers, which operate in a host server environment. As depicted, the identification server 303 may include an identification service 534 that provides operations discussed elsewhere herein and, in some instances, a web server 536 for communicating with client devices 301 or other devices. The identification server 303 may also host other services such as a third-party application (not shown), which may be individual and/or incorporated into the services provided by the identification server 303.

The third-party server(s) 522 and the application server(s) 524 may also have data processing, storing, and communication capabilities, and, similar to the identification server 303 534, they may each include one or more hardware servers, server arrays, storage devices and/or systems, etc.

In some implementations, the third-party server 522 may provide data, analytics, or other services to mobile applications 544 and/or may use the identification of a client device 301 described throughout this disclosure.

The application server(s) 524 may provide data or other services to the mobile application(s) 544. In some implementations, the application server(s) 524 may include an instance of the identification service 534 or may communicate with the identification service 534 on the server 534 to determine an identity of a user/client device 301. Additionally, or alternatively, the application server(s) 524 may use the device ID established by the identification service 534 to perform operations, for example, in association with the mobile application(s) 544.

As illustrated in the example of FIG. 5, a first ID engine 542a may be executed on a first client device 301a and may communicate with one or more mobile applications 544a to identify the client device 301a to the mobile application(s) 544a. The ID engine 542a may use a locally stored private key in the data storage 546a to match a key derivative, as described elsewhere herein. Similarly, another client device 301n may use another instance of the ID engine 542n, one or more second mobile application(s) 544n, and another data storage 546n. In some implementations, the identification service 534 may track a single user across multiple client devices 301 by associating parameters, key derivatives, device ID, or other data in the data storage 538.

In some implementations, various data storage devices 546a . . . 546n and 538 may be accessible or stored on the devices 301 or 303. For instance, a client device 301 may include a data storage 546 dedicated to storing private keys, such as a secure folder, secure enclave, local storage, cryptographic wallet, or other storage accessible to one or a plurality of applications. The client device 301 may additionally or alternatively have data storage for storage associated with individual applications, which may store key derivatives, client IDs, or fingerprinting data, etc. Additionally, the identification server 303 may include data storage 534 for storing tables of client IDs, parameters, fingerprinting data, key derivatives, events, or other data, as described elsewhere herein in further detail.

As noted elsewhere herein, the data storage or database 538 may include/store various data tables, such as a table that contains a device ID (e.g., generated by the ID engine 542 or identification service 534), a key derivative, device data for fingerprinting (e.g., where each device 301 is represented in a row). The database 538 may also include other tables used to represent events performed in each individual application 544, other interactions, or other data, which may be linked to a main device table describing the device 301, key derivatives, parameters, or other data.

Figure 6:
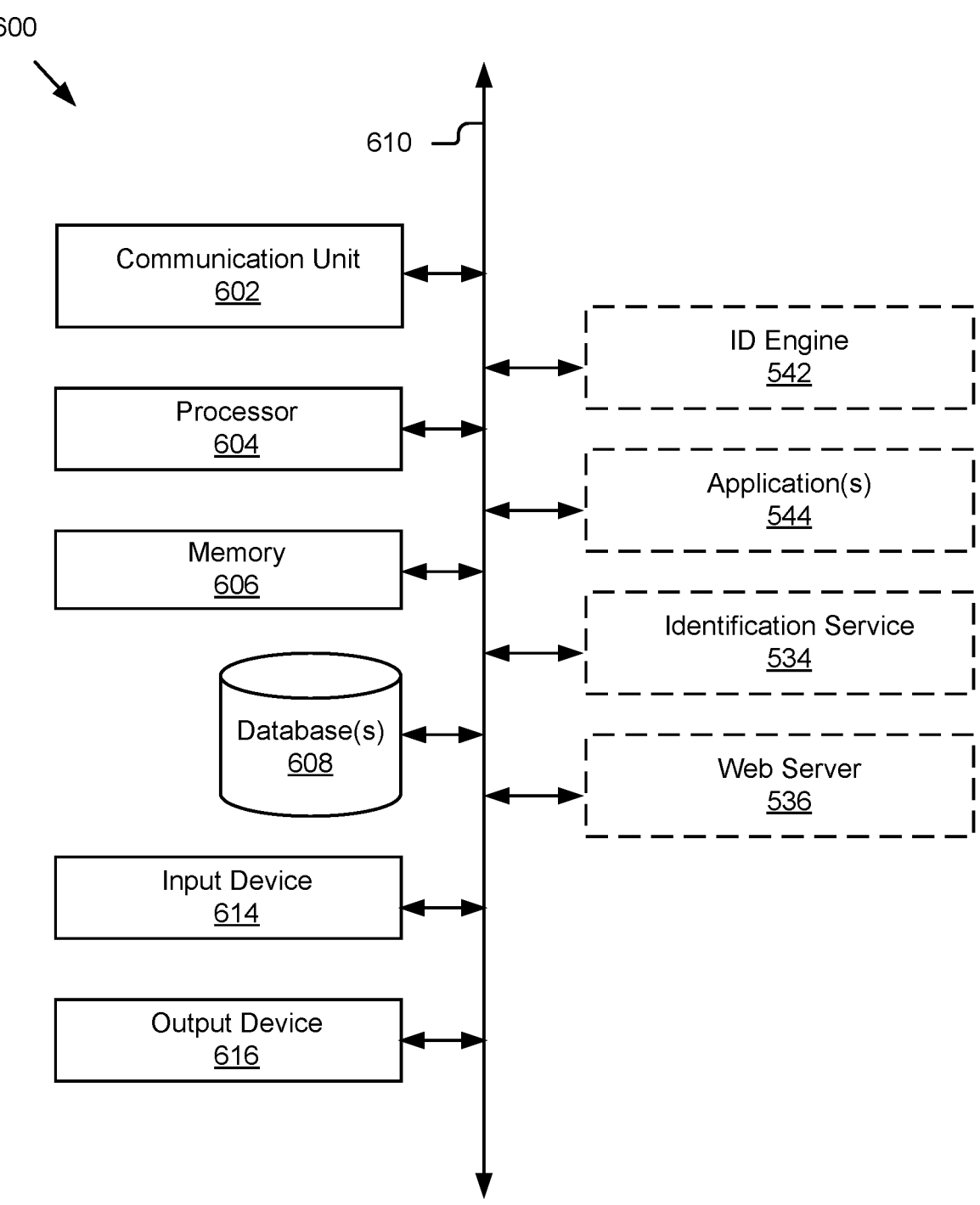
FIG. 6 illustrates a computing device.

FIG. 6 illustrates a computing device 600 that can be implemented as the client device 301, third-party server 522, application server 524, or the identification server 303, for example. As depicted, the computing device 600 may include a communication unit 602, a processor 604, a memory 606, database(s) 608, an input device 614, an output device 616, the ID engine 542, application(s) 544, identification service 534, or web server 536, etc., which may be communicatively coupled by a communication bus 610. The computing device 600 depicted in FIG. 6 is provided by way of example and it should be understood that it may take other forms and include additional or fewer components without departing from the scope of the present disclosure. For instance, various components of the computing devices may be coupled for communication using a variety of communication protocols and/or technologies including, for instance, communication buses, software communication mechanisms, computer networks, etc. While not shown, the computing device 600 may include various operating systems, sensors, additional processors, and other physical configurations. Although, for purposes of clarity, FIG. 6 only shows a single communication unit 602, processor 604, memory 606, etc. It should be understood that the computing device 600 may include a plurality of one or more of these components.

The processor 604 may execute software instructions by performing various input, logical, and/or mathematical operations. The processor 604 may have various computing architectures to method data signals including, for example, a complex instruction set computer (CISC) architecture, a reduced instruction set computer (RISC) architecture, and/or an architecture implementing a combination of instruction sets. The processor 604 may be physical and/or virtual and may include a single core or plurality of processing units and/or cores. In some implementations, the processor 604 may be capable of generating and providing electronic display signals to a display device, supporting the display of images, capturing and transmitting images, performing complex tasks including various types of feature extraction and sampling, etc. In some implementations, the processor 604 may be coupled to the memory 606 via the bus 610 to access data and instructions therefrom and store data therein. The bus 610 may couple the processor 604 to the other components of the computing device 600 including, for example, the communication unit 602, the memory 606, the input device 614, the output device 616, and the database(s) 608.

The memory 606 may store and provide access to data to the other components of the computing device 600. The memory 606 may be included in a single computing device or a plurality of computing devices. In some implementations, the memory 606 may store instructions and/or data that may be executed by the processor 604. For example, the memory 606 may store an instance of the applications, engines, etc., described herein, and their respective components, depending on the configuration. The memory 606 is also capable of storing other instructions and data, including, for example, an operating system, hardware drivers, other software applications, databases, etc. The memory 606 may be coupled to the bus 610 for communication with the processor 604 and the other components of the computing device 600.

The memory 606 may include a non-transitory computer-usable (e.g., readable, writeable, etc.) medium, which can be any non-transitory apparatus or device that can contain, store, communicate, propagate or transport instructions, data, computer programs, software, code, routines, etc., for processing by or in connection with the processor 604. In some implementations, the memory 606 may include one or more of volatile memory and non-volatile memory (e.g., RAM, ROM, hard disk, optical disk, etc.). It should be understood that the memory 606 may be a single device or may include multiple types of devices and configurations.

The bus 610 may include a communication bus for transferring data between components of a computing device or between computing devices, a network bus system including the network 510 or portions thereof, a processor mesh, a combination thereof, etc. In some implementations, the identification server 303, the ID engine 542, the application(s) 544, the identification service 534, the web server 536, and various other components operating on the computing device 600 (operating systems, device drivers, etc.) may cooperate and communicate via a communication mechanism included in or implemented in association with the bus 610. The software communication mechanism can include and/or facilitate, for example, inter-method communication, local function or procedure calls, remote procedure calls, an object broker (e.g., CORBA), direct socket communication (e.g., TCP/IP sockets) among software modules, UDP broadcasts and receipts, HTTP connections, etc. Further, any or all of the communication could be secure (e.g., SSH, HTTPS, etc.).

The communication unit 602 may include one or more interface devices (I/F) for wired and wireless connectivity among the components of the system 500. For example, the communication unit 602 may include various types of connectivity and interface options. The communication unit 602 may be coupled to the other components of the computing device 600 via the bus 610. The communication unit 602 may be electronically communicatively coupled to the network 510 (e.g., wiredly, wirelessly, etc.). In some implementations, the communication unit 602 may link the processor 604 to the network 510, which may in turn be coupled to other processing systems. The communication unit 602 may provide other connections to the network 510 and to other entities of the computing system 500 using various standard communication protocols.

The input device 614 may include any device for inputting information into the computing device 600. In some implementations, the input device 614 may include one or more peripheral devices. For example, the input device 614 may include a sensor, a keyboard (e.g., a virtual keyboard), a pointing device (e.g., a virtual mouse device), a microphone for receiving user input via speech, an image/video capture device (e.g., camera), a touch-screen display integrated with the output device 616, etc.

The output device 616 may be any device capable of outputting information from the computing device 600. The output device 616 may include one or more of a speaker, a display (LCD, OLED, etc.), a haptic device, a touch-screen display, a light indicator, etc. In some implementations, the output device 616 may be a display that can display electronic content (e.g., images, videos, etc.) with different representation effects (e.g., rewind, overlaid animation, etc.). In some implementations, the computing device 600 may include a graphics adapter (not shown) for rendering and outputting the electronic content for presentation on the output device 616. The graphics adapter (not shown) may be a separate processing device including a separate processor and memory (not shown) or may be integrated with the processor 604 and the memory 606.

The database(s) 608 may be data store(s) for storing and providing access to data. The data stored by the database(s) 608 may be organized and queried using any type of data stored in the database(s) 608 (e.g., keys, key pairs, key derivatives, parameters, fingerprinting data, device IDs, event data, or other data, etc.). The database(s) 608 may include file systems, databases, data tables, documents, or other organized collections of data.

The database(s) 608 may be included in the computing device 600 or in another computing system and/or storage system distinct from but coupled to or accessible by the computing device 600. The database(s) 608 may include one or more non-transitory computer-readable mediums for storing the data. In some implementations, the database(s) 608 may be incorporated with the memory 606 or may be distinct therefrom. In some implementations, the database(s) 608 may store data associated with a database management system (DBMS) operable on the computing device 600. For example, the DBMS could include a structured query language (SQL) DBMS, a NoSQL DMBS, various combinations thereof, etc. In some instances, the DBMS may store data in multi-dimensional tables comprised of rows and columns, and manipulate, e.g., insert, query, update and/or delete, rows of data using programmatic operations.

The components may be communicatively coupled by the bus 610 and/or the processor 604 to one another and/or to other components of the computing system 500. As discussed elsewhere herein, one or more of the components 542, 544, 534, or 536 may include computer logic (e.g., software logic, hardware logic, etc.) executable by the processor 604 to provide functionalities described herein. In any of the implementations discussed above, the components may be adapted for cooperation and communication with the processor 604 and/or other components of the computing system 500.

It should be understood that the computing system 500 illustrated in FIG. 5 and the computing device 600 illustrated in FIG. 6 are representative of example systems and that a variety of different system environments and configurations are contemplated and are within the scope of the present disclosure. For example, various acts and/or functionality may be moved from a server to a client, or vice versa, data may be consolidated into a single data store or further segmented into additional data stores, and some implementations may include additional or fewer computing devices, services, and/or networks, and may implement various functionality client or server-side. Further, various entities of the system may be integrated into a single computing device or system or divided into additional computing devices or systems, etc.

Methods are described herein; however, it should be understood that the methods are provided by way of example, and that variations and combinations of these methods, as well as other methods, are contemplated. For example, in some implementations, at least a portion of one or more of the methods represent various elements of one or more larger methods and may be concatenated or various steps of these methods may be combined to produce other methods which are encompassed by the present disclosure. Additionally, it should be understood that various operations in the methods may in some cases be iterative, and thus repeated as many times as necessary generate the results described herein. Further the ordering of the operations in the methods is provided by way of example and it should be understood that various operations may occur earlier and/or later in the method without departing from the scope thereof.

In the above description, for purposes of explanation, numerous specific details are set forth in order to provide a thorough understanding of the present disclosure. However, it should be understood that the technology described herein can be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms such as "processing," "computing," "calculating," "determining," "displaying," or the like, refer to the action and methods of a computer system that manipulates and transforms data represented as physical (electronic) quantities within the computer system's registers and memories into other data similarly represented as physical quantities within the computer system memories or registers or other such information storage, transmission or display devices.

A data processing system suitable for storing and/or executing program code, such as the computing system and/or devices discussed herein, may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices can be coupled to the system either directly or through intervening I/O controllers. The data processing system may include an apparatus that may be specifically constructed for the required purposes, or it may comprise a general-purpose computer selectively activated or reconfigured by a computer program stored in the computer.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects may not be mandatory or significant, and the mechanisms that implement the specification or its features may have different names, divisions and/or formats.

Furthermore, the modules, routines, features, attributes, methodologies, and other aspects of the disclosure can be implemented as software, hardware, firmware, or any combination of the foregoing. The technology can also take the form of a computer program product accessible from a computer-usable or computer-readable medium providing program code for use by or in connection with a computer or any instruction execution system. Wherever a component, an example of which is a module or engine, of the specification is implemented as software, the component can be implemented as a standalone program, as part of a larger program, as a plurality of separate programs, as a statically or dynamically linked library, as a kernel loadable module, as firmware, as resident software, as microcode, as a device driver, and/or in every and any other way known now or in the future. Additionally, the disclosure is in no way limited to implementation in any specific programming language, or for any specific operating system or environment. Accordingly, the disclosure is intended to be illustrative, but not limiting, of the scope of the subject matter set forth in the following claims.

What is claimed is:

1. A method comprising:

receiving, by a client device, a set of multiple candidate data representations from a server, each of the set of multiple candidate data representations being associated with a candidate device identifier of a set of multiple candidate device identifiers;

determining, by the client device, a matching data representation from among the set of multiple candidate data representations based on the matching data representation corresponding to a private key accessible by the client device;

selecting a device identifier from among the set of multiple candidate device identifiers based on the matching data representation; and performing, by the client device, one or more operations respective to a launched application using the device identifier.

2. The method of claim 1, further comprising:

launching, by the client device, the application on the client device; and responsive to launching the application on the client device, transmitting, by the client device, a set of device parameters to the server, the set of device parameters indicating one or more of a model, a location, and a cellular carrier of the client device.

3. The method of claim 2, further comprising:

filtering, by the server, a set of data representations to determine the set of multiple candidate data representations using the set of device parameters;

determining, by the server, the set of multiple candidate device identifiers corresponding to the set of multiple candidate data representations; and transmitting, by the server, the set of multiple candidate data representations and the set of multiple candidate device identifiers to the client device.

4. The method of claim 3, wherein:

determining the matching data representation from the set of multiple candidate data representations includes decrypting the matching data representation using the private key; and determining the device identifier based on the matching data representation includes determining the device identifier from the set of multiple candidate device identifiers received from the server based on an association of the device identifier with the matching data representation.

5. The method of claim 1, further comprising:

determining, by the client device, that a previous set of candidate data representations lacks a match with one or more private keys accessible to the client device;

generating, by the client device, the private key and a key derivative matching the private key, the matching data representation including the generated key derivative; and transmitting, by the client device, the key derivative to the server.

6. The method of claim 5, further comprising:

determining, by the server, the device identifier;

associating, by the server, the device identifier with the matching data representation in a data table accessible to the server; and transmitting, by the server, the device identifier to the client device, the client device storing the received device identifier locally and using the device identifier for communications with the server.

7. The method of claim 5, further comprising:

transmitting, by the client device, a set of device parameters to the server, the set of device parameters indicating one or more of a model, a location, and a cellular carrier of the client device; and storing, by the server, the set of device parameters in a data table accessible to the server in association with the matching data representation.

8. The method of claim 1, wherein:

the matching data representation includes a public key derived from the private key.

9. The method of claim 1, wherein:

determining the matching data representation from the set of multiple candidate data representations includes querying, by the client device, a local secure data store on the client device to determine whether one or more of the set of multiple candidate data representations corresponds to the private key stored in the local secure data store.

10. A system comprising:

one or more processors; and one or more computer memories storing instructions that, when executed by the one or more processors, cause the system to perform operations including:

receiving a set of multiple candidate data representations, each of the set of multiple candidate data representations being associated with a candidate device identifier of a set of multiple candidate device identifiers;

determining a matching data representation from among the set of multiple candidate data representations based on the matching data representation corresponding to a private key;

selecting a device identifier identifying a client device from among the set of multiple candidate device identifiers based on the matching data representation; and performing one or more operations respective to a launched application using the device identifier.

11. The system of claim 10, wherein the operations further comprise:

launching the application on the client device; and responsive to launching the application on the client device, transmitting a set of device parameters to a server, the set of device parameters indicating one or more of a model, a location, and a cellular carrier of the client device.

12. The system of claim 11, wherein the operations further comprise:

filtering a set of data representations to determine the set of multiple candidate data representations using the set of device parameters;

determining the set of multiple candidate device identifiers corresponding to the set of multiple candidate data representations; and transmitting the set of multiple candidate data representations and the set of multiple candidate device identifiers to the client device.

13. The system of claim 12, wherein:

determining the matching data representation from the set of multiple candidate data representations includes decrypting the matching data representation using the private key; and determining the device identifier based on the matching data representation includes determining the device identifier from the set of multiple candidate device identifiers received from the server based on an association of the device identifier with the matching data representation.

14. The system of claim 10, wherein the operations further comprise:

determining that a previous set of candidate data representations lacks a match with one or more private keys accessible to the client device;

generating the private key and a key derivative matching the private key, the matching data representation including the generated key derivative; and transmitting the key derivative to a server.

15. The system of claim 14, wherein the operations further comprise:

determining the device identifier;

associating the device identifier with the matching data representation in a data table accessible to the server; and transmitting the device identifier to the client device, the client device storing the received device identifier locally and using the device identifier for communications with the server.

16. The system of claim 14, wherein the operations further comprise:

transmitting a set of device parameters to the server, the set of device parameters indicating one or more of a model, a location, and a cellular carrier of the client device; and storing the set of device parameters in a data table accessible to the server in association with the matching data representation.

17. The system of claim 10, wherein:

the matching data representation includes a public key derived from the private key.

18. The system of claim 10, wherein:

determining the matching data representation from the set of multiple candidate data representations includes querying a local secure data store on the client device to determine whether one or more of the set of multiple candidate data representations corresponds to the private key stored in the local secure data store.

19. A method comprising:

receiving, by a server, a set of device parameters describing a client device;

filtering, by the server, a set of key derivatives to determine a set of multiple candidate key derivatives using the set of device parameters;

determining, by the server, a set of multiple candidate device identifiers corresponding to the set of multiple candidate key derivatives;

transmitting, by the server, the set of multiple candidate key derivatives and the set of multiple candidate device identifiers to the client device; and receiving, by the server, an indication of a matched data representation from the client device, the client device determining the matched data representation from among the multiple candidate data representations based on the matched data representation corresponding to a private key accessible by the client device.

20. The method of claim 19, further comprising:

receiving, by the server, a key derivative from the client device;

determining, by the server, a device identifier;

associating, by the server, the device identifier with the key derivative and the set of device parameters in a data table accessible to the server; and transmitting, by the server, the device identifier to the client device, the client device storing the received device identifier locally and using the device identifier for communications with the server.

* * * * *